(12) United States Patent
Takenaka

(10) Patent No.: US 10,430,132 B2
(45) Date of Patent: Oct. 1, 2019

(54) COMMUNICATION TERMINAL, METHOD OF CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Shuichi Takenaka, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/982,347

(22) Filed: May 17, 2018

(65) Prior Publication Data

US 2018/0335991 A1 Nov. 22, 2018

(30) Foreign Application Priority Data

May 22, 2017 (JP) ................................. 2017-101143

(51) Int. Cl.
*G06F 3/12* (2006.01)

(52) U.S. Cl.
CPC .......... *G06F 3/1238* (2013.01); *G06F 3/1222* (2013.01); *G06F 3/1236* (2013.01); *G06F 3/1292* (2013.01)

(58) Field of Classification Search
USPC ....................................................... 358/1.13
See application file for complete search history.

(56) References Cited

U.S. PATENT DOCUMENTS

| 2014/0233053 | A1* | 8/2014 | Kakutani | G06F 3/1222 |
| | | | | 358/1.14 |
| 2016/0299725 | A1* | 10/2016 | Hosoda | H04W 12/08 |
| 2016/0373594 | A1* | 12/2016 | Kurihara | H04N 1/00103 |
| 2017/0102903 | A1* | 4/2017 | Nagasawa | G06F 3/1222 |
| 2017/0264758 | A1* | 9/2017 | Naito | H04W 12/06 |

FOREIGN PATENT DOCUMENTS

JP 2016126732 A 7/2016

* cited by examiner

*Primary Examiner* — Ngon B Nguyen
(74) *Attorney, Agent, or Firm* — Rossi, Kimms & McDowell LLP

(57) ABSTRACT

A communication terminal and a method of controlling thereof are provided for setting user information that includes at least a user name and a domain name, and transmitting a print job to which the user information is given to an image forming apparatus. Then, when logging in to the image forming apparatus by using the user information, based on whether the image forming apparatus is under domain management, it is determined whether or not to include information concerning a domain name in a login request for the image processing apparatus.

21 Claims, 14 Drawing Sheets

| USER IDENTIFIER | USER NAME | DOMAIN NAME | PRINT DATA |
|---|---|---|---|
| UserA@DomainA | UserA | DomainA | AAAAA.prn |
| UserA@DomainA | UserA | DomainA | BBBBB.prn |
| UserA@DomainA | UserA | DomainA | FFFFF.prn |
| UserA@DomainA | UserA | DomainA | GGGGG.prn |

COMMUNICATION TERMINAL, METHOD OF CONTROLLING THE SAME, AND NON-TRANSITORY COMPUTER-READABLE STORAGE MEDIUM

BACKGROUND OF THE INVENTION

Field of the Invention

The present invention relates to a communication terminal, a method of controlling the same, and a non-transitory computer-readable storage medium.

Description of the Related Art

In recent years, a mobile terminal capable of cooperating with an image processing apparatus such as a printer comes onto the market. By using such a mobile terminal, it is possible to transmit print data to the printer to be printed.

In addition to thus transmitting the print data from a printer driver that has conventionally been used in general and installed in a personal computer (to be referred to as a PC hereinafter) to the printer to be printed, an opportunity of performing printing from the mobile terminal increases. A case in which a print job is input from such a mobile terminal to the printer is considered to increase also in the future. As a cooperative function between the mobile terminal and the printer, there is a function of transmitting user information held in the mobile terminal to the printer by using a near-field wireless communication function and performing login processing (to be referred to as panel login hereinafter) to the printer by a user of the mobile terminal.

For example, Japanese Patent Laid-Open No. 2016-126732 has described that a mobile terminal can obtain login screen information from an image processing apparatus by using near-field wireless communication and log in to the image processing apparatus by using the screen. At this time, the mobile terminal can display a screen based on screen information, transmit user information input via the screen to the image processing apparatus, and cause a user based on the user information to log in to the image processing apparatus.

There is an image processing apparatus that has a storing printing function capable of temporarily storing print data input from an external terminal in a storage unit without printing it immediately. In this storing printing function, when the print data is received from the external terminal, it is temporarily held in a spool area in the image processing apparatus. Then, the user who inputs the print data can select and print the print data stored in the image processing apparatus by operating a console unit of the image processing apparatus after logging in to the image processing apparatus. In such storing printing function, the print data is identified based on the user information included in the print data. For example, the print data includes a user name, a domain name, and the like to which the print data are input, and the image processing apparatus manages the print data based on the user name, the domain name, and the like when performing storing printing.

It is considered here that as a cooperative function to be performed by the user from the mobile terminal, both a panel login function and a printing function are provided. In this case, the user information is used in both a case in which the storing printing is performed from the mobile terminal and a case in which the panel login function is performed by using the mobile terminal.

In a case in which there are many opportunities of using the user information as described above, setting, in advance on the mobile terminal, user information used in the cooperative function is more convenient to the user than causing the user to input the user information each time. However, user information for specifying an owner of the print data in the storing printing function and user information for uniquely identifying a user who logs in to the image processing apparatus in the panel login function may be different in usage though they are the same setting item.

More specifically, in the storing printing, when printing is performed from a plurality of terminals such as a PC, a mobile terminal, and the like owned by the user, it is more convenient to be able to manage print data stored as a job of the same user. In this case, by setting user information (a user name and a domain name) usually used in the PC as user information used in the cooperative function, the user can use the storing printing with the same sense as a case in which the user information is input from the PC.

On the other hand, also in the panel login function, login may fail if cooperation with the image processing apparatus is performed based on the same user information. For example, a case in which the image processing apparatus adopts a local authentication that manages the user in the image processing apparatus as the mechanism of user authentication at the time of login will be considered. In this case, the image processing apparatus that has received user information from the mobile terminal tries to perform the user authentication by using an external authentication server based on the domain name. In this case, the image processing apparatus cannot be connected to the authentication server and may fail panel login from the mobile terminal to the image processing apparatus.

SUMMARY OF THE INVENTION

An aspect of the present invention is to eliminate the above-mentioned problem with conventional technology.

A feature of the present invention is to provide a technique capable of changing user information used for cooperation in accordance with authentication in an image forming apparatus in an information processing apparatus that cooperates with the image processing apparatus.

Another feature of the present invention is to provide a mechanism capable of simplifying the setting of user information used for processing.

According to a first aspect of the present invention, there is provided a non-transitory computer-readable storage medium storing a program for causing a computer to execute a method of controlling a communication terminal, the method comprising: setting user information that includes at least a user name and a domain name; transmitting print data that includes information concerning the user information to an image processing apparatus; and determining whether or not to include information concerning the domain name in a login request for the image processing apparatus based on whether the image processing apparatus is under domain management.

According to a second aspect of the present invention, there is provided a method of controlling a communication terminal, the method comprising: setting user information that includes at least a user name and a domain name; transmitting print data that includes information concerning the user information to an image processing apparatus; and determining whether or not to include information concerning the domain name in a login request for the image processing apparatus based on whether the image processing apparatus is under domain management.

According to a third aspect of the present invention, there is provided a communication terminal, comprising: a memory device that stores a set of instructions; and at least one processor that executes instructions stored in the memory device to: set user information that includes at least a user name and a domain name; transmit print data that includes information concerning the user information to an image processing apparatus; and determine whether or not to include information concerning the domain name in a login request for the image processing apparatus based on whether the image processing apparatus is under domain management.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

A mobile terminal (information processing apparatus) according to this embodiment provides an item that sets the use environment of an image forming apparatus which achieves a desired function in cooperation with the mobile terminal in its application and switches user information used for each function by the set item. This application can perform both storing printing and panel login, and set, as user information, a user name and a domain name needed when an external authentication server performs user authentication. In addition, the mobile terminal provides an item capable of setting whether an image forming apparatus to be logged in by the user using a panel login function is under domain management.

This application generates a storing printing job by using the user name and domain name of the user information when storing printing is performed. On the other hand, when the panel login function is performed, user information to be transmitted is switched depending on the item for setting whether the image forming apparatus is under domain management. More specifically, the domain name is used for user information at the time of panel login if the image forming apparatus is under domain management, and the domain name is not used for the user information at the time of panel login if the image forming apparatus is not under domain management.

Consequently, based on the same user information, the domain name is used only at the time of a storing printing function to generate a storing printing job capable of job management in the same job list as a PC under domain management. On the other hand, in an environment where the image forming apparatus is not under domain management, the panel login function is executed by performing control so as not to use the domain name of the user information at the time of login. This makes it possible to execute both the storing printing function and the panel login function by using the same user information even in an environment where a PC which is under domain management and an image forming apparatus which is not under domain management exist.

First Embodiment

Figure 1:
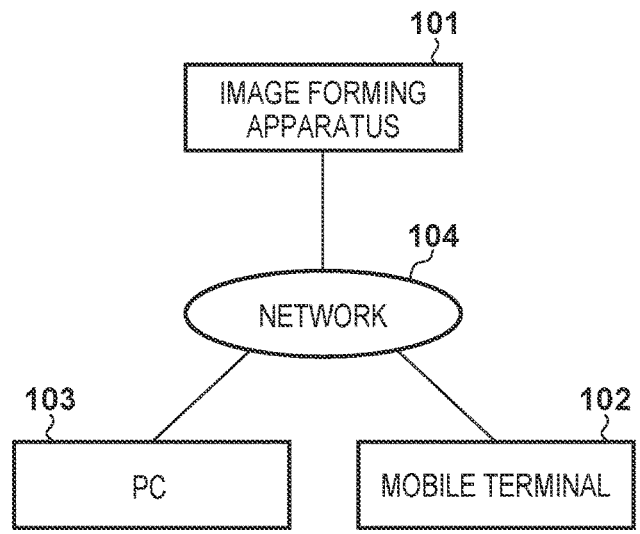
FIG. 1 is a diagram showing an example of the arrangement of a system according to a first embodiment of the present invention.

FIG. 1 is a diagram showing an example of the arrangement of a system according to the first embodiment of the present invention.

The system according to the first embodiment includes an image forming apparatus 101, a mobile terminal 102, and a PC 103. The image forming apparatus 101, the mobile terminal 102, and the PC 103 are connected to each other via a network 104.

The image forming apparatus 101 is a multi-function peripheral having various functions of, for example, scan, FAX, print, copy, and the like and has a storing printing function. When the storing printing function is used, the image forming apparatus 101 temporarily holds print data in a spool area in the image forming apparatus upon receiving the print data from an external terminal such as the PC 103 or the mobile terminal 102. A user who inputs the print data can select and print the print data stored in the image processing apparatus by operating a console unit of the image processing apparatus after logging in to the image forming apparatus.

In the storing printing function according to the first embodiment, a user identifier is generated from user information given to the print data to manage a print job for printing received print data. The user identifier is generated by combining a user name and domain name included in the user information. If the user information does not include the domain name, a user identifier that includes only the user name is generated.

The image forming apparatus 101 also has a panel login function as a function of cooperating with the mobile terminal 102. The panel login function provides a function of allowing the user to log in to the image forming apparatus 101 in cooperation with the mobile terminal 102. The image forming apparatus 101 that has received a login request from the mobile terminal 102 determines, in accordance with the login request from the mobile terminal 102, whether or not to permit login of the user. If login is permitted, the image forming apparatus 101 displays a screen capable of using the respective functions of copy, scan, and the like of the image forming apparatus 101 on a display unit 409 (FIG. 4), and shifts to a state capable of using the respective functions via the display unit 409.

Therefore, the user can shift to a state capable of using respective operations of the image forming apparatus 101 via the display unit 409 of the image forming apparatus 101 only by bringing the mobile terminal 102 closer to the image forming apparatus 101. Causing the user to log in to the image forming apparatus 101 and to shift to the state capable of using the respective functions of the image forming apparatus 101 via the display unit 409 will be referred to as panel login hereinafter.

Panel login in the first embodiment may use an LDAP server such as an Active Directory, Open LDAP, or the like as a login authentication server and apply domain authentication. When the LDAP server is used, the user is under domain management, and a login restriction according to user information is applied. Accordingly, if the image forming apparatus 101 is under domain management, LDAP authentication using the domain name of the user information is applied at the time of panel login. If the image forming apparatus 101 does not use the LDAP server for login authentication and is not under domain management, it determines whether or not to permit login of the user by local device authentication based on user account information stored in the main body of the image forming apparatus 101. Therefore, if the image forming apparatus 101 is not under domain management, the domain name of the user information is not used at the time of panel login. If the user information includes the domain name in spite of the fact that the image forming apparatus 101 is not under domain management, the image forming apparatus 101 regards this as an invalid value and does not permit login of the user. The image forming apparatus 101 internally generates a user identifier based on user information at the time of panel login transmitted from the mobile terminal 102. Comparing this user identifier with a user identifier managed as the storing printing job, a matched identifier is displayed as a relevant job in a job list.

Figure 3:
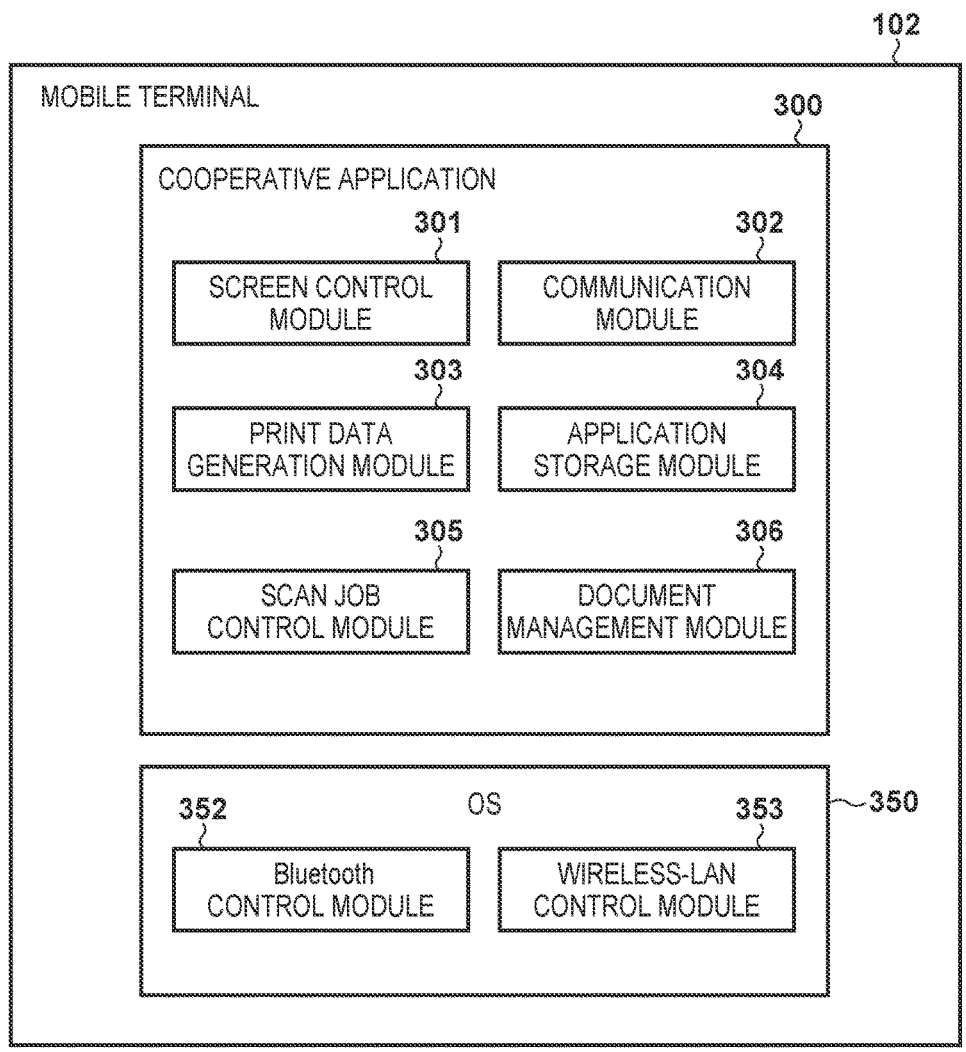
FIG. 3 is a functional block diagram for explaining the software arrangement of the mobile terminal according to the first embodiment.

The mobile terminal 102 is a portable telephone, PDA held by the user, or a mobile terminal such as a multi-function mobile phone (to be referred to as a smartphone hereinafter) or a tablet which is rapidly proliferating in recent years. Note that the mobile terminal 102 according to this first embodiment is assumed to be an apparatus such as the smartphone or the tablet, but may be another apparatus as long as it is an information processing apparatus capable of performing near-filed wireless communication. A cooperative application 300 to cooperate with the image forming apparatus 101 is installed in the mobile terminal 102 (FIG. 3).

The cooperative application 300 provides a function of converting document data browsed and edited by the mobile terminal 102 into print data and transmitting it to the image forming apparatus 101. Further, the cooperative application 300 manages, as user information, a user name and domain name usable in storing printing or panel login. When the print data is generated, managed user information is added to the print data. The cooperative application 300 also provides a function of performing panel login to the image forming apparatus 101. In the panel login function, data such as user information is transmitted/received to/from a Bluetooth® communication unit 209 (FIG. 2) of the mobile terminal 102 and a Bluetooth communication control module 520 (FIG. 5) of the image forming apparatus 101, performing login processing. For example, the cooperative application 300 transmits data such as user information to the image forming apparatus 101 by GATT (Generic Attributes) communication of Bluetooth Low Energy (to be referred to as BLE hereinafter). If user authentication succeeds in the image forming apparatus 101, the image forming apparatus 101 causes the user to log in to the image forming apparatus 101 and shifts to a state in which the user can use respective operations of the image forming apparatus 101.

The PC 103 is a personal computer. A printer driver for generating print data and transmitting the print data to the image forming apparatus 101 is installed in the PC 103. Similarly to the mobile terminal 102, the PC 103 can also convert browsed and edited document data into print data, and transmit it to the image forming apparatus 101. The printer driver can set and manage user information given to the print data. When the print data is generated, the user information is added to the print data. Note that it is also possible to add, to the print data, user information used under management of the user of the PC 103 (user information corresponding to a user who is logging in to the PC 103).

The network 104 is a wireless or wired network formed by a WAN or a LAN. The PC 103 transmits the print data to the image forming apparatus 101 via the network 104.

Figure 2:
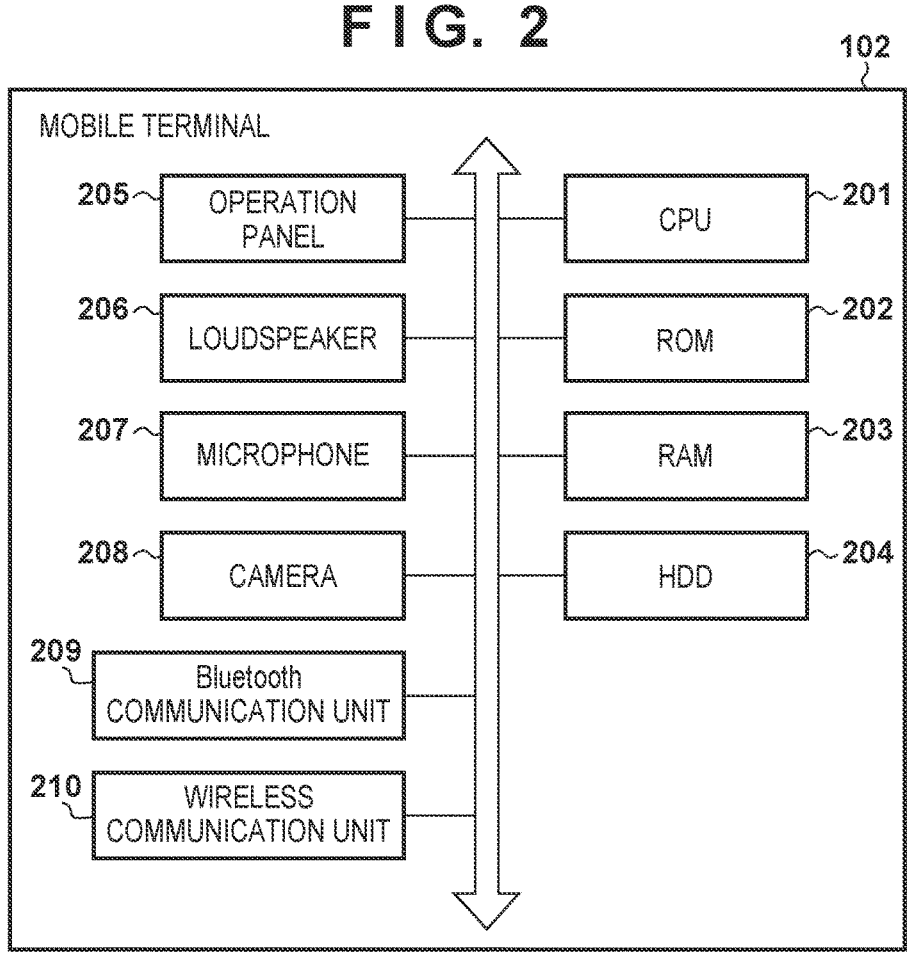
FIG. 2 is a block diagram for explaining the hardware arrangement of a mobile terminal according to the first embodiment.

FIG. 2 is a block diagram for explaining the hardware arrangement of the mobile terminal 102 according to the first embodiment.

A CPU (Central Processing Unit) 201 deploys control programs stored by a ROM 202 or an HDD 204 in a RAM 203 and executes the programs, thereby controlling the operation of the mobile terminal 102. The ROM 202 stores the control program, apparatus setting information, or the like. The RAM 203 is used as a temporary storage area such as a main memory, a work area, and the like for the CPU 201. The HDD (Hard Disk Drive) 204 stores various data such as a photo, a digital document, and the like. An OS (Operating System) 350 (FIG. 3) and the cooperative application 300 to be described later are also stored in the HDD 204.

Note that in the mobile terminal 102, one CPU 201 performs respective processes shown in a flowchart to be described later. However, another mode may be adopted. It is also possible to perform the respective processes shown in the flowchart to be described later by, for example, cooperating a plurality of processors, RAMs, ROMs, storages, and respective I/Fs with each other. It is also possible to perform some processes such as a process of generating print data in cooperation with a cloud service or the like accessible via a network.

An operation panel 205 has a touch panel function capable of detecting a touch operation by the user, and displays various screens provided by the OS 350 and the cooperative application 300. The user can input a desired operation instruction to the mobile terminal 102 by performing the touch operation to the operation panel 205. A loudspeaker 206 and a microphone 207 are used when the user calls another mobile terminal or a fixed-line phone. A camera 208 captures an image in response to an image capturing instruction from the user. Image data of a photo captured by the camera 208 is stored in a predetermined area of the HDD 204. The image data of the photo captured by the camera 208 can be referred to from the cooperative application 300 and used for printing. The user can print image data of a photo obtained by the camera 208 by selecting an image and giving a print instruction from the cooperative application 300. The Bluetooth communication unit 209 performs wireless communication in accordance with the Bluetooth standard and mutually communicates with another apparatus including a Bluetooth I/F. In the first embodiment, the Bluetooth communication unit 209 mutually communicates with the image forming apparatus 101 in accordance with the Bluetooth standard. A wireless communication unit 210 performs wireless communication complying with the IEEE802.11 series.

FIG. 3 is a functional block diagram for explaining the software arrangement of the mobile terminal 102 according to the first embodiment. Respective functional modules shown in FIG. 3 indicate software functions implemented by causing the CPU 201 to deploy control programs stored in the ROM 202 or the HDD 204 in the RAM 203, and execute the programs.

The OS 350 is software for controlling the operation of the entire mobile terminal 102. Various applications including the cooperative application 300 to be described later can be installed in the mobile terminal 102. The OS 350 exchanges information with these applications and in accordance with an instruction received from an application, changes screens displayed on the operation panel 205. Further, the OS 350 includes a device driver group for controlling various hardware components and provides an API for using the various hardware components for an application operating on the OS. As the device driver group, a Bluetooth control module 352 and a wireless-LAN control module 353 exist in the first embodiment. The Bluetooth control module 352 is a device driver for controlling the Bluetooth communication unit 209. The wireless-LAN control module 353 is a device driver for controlling the wireless communication unit 210.

The cooperative application 300 is an application installed in the mobile terminal 102. An operation such as print or scan can be performed on the image forming apparatus 101 from the cooperative application 300. In addition to this cooperative application 300, various applications are installed in the mobile terminal 102. However, a description thereof will be omitted.

The software arrangement of the cooperative application 300 will be described below in more detail. A screen control module 301 controls a screen displayed on the operation panel 205 via the OS 350. The screen control module 301 displays a cooperative application screen on the operation panel 205. Further, the screen control module 301 discriminates an operation instruction input by the user via the operation panel 205. A communication module 302 controls near-field wireless communication by the Bluetooth communication unit 209 or wireless communication by the wireless communication unit 210 via the OS 350 to, for example, transmit/receive a command.

Figure 4:
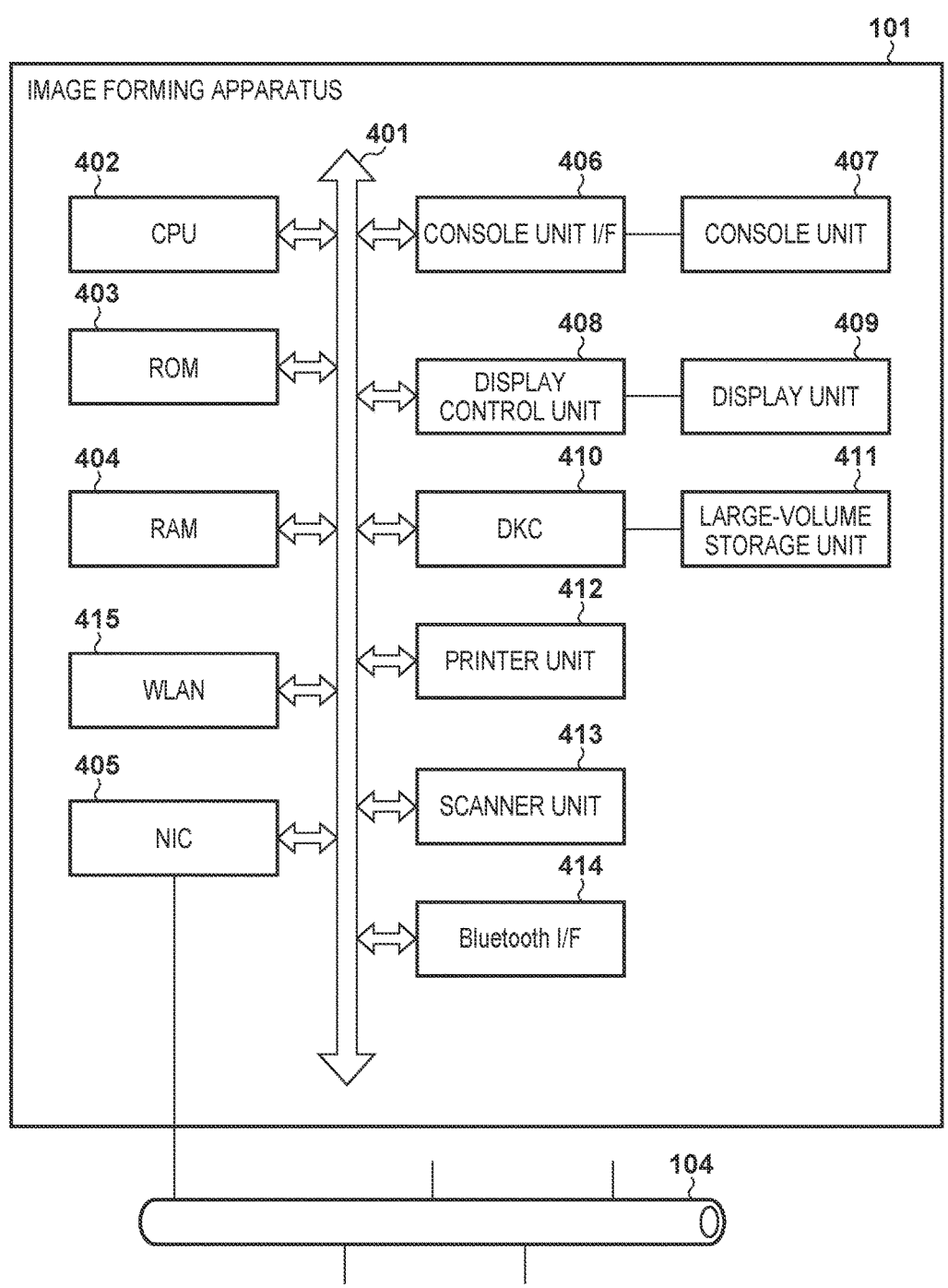
FIG. 4 is a block diagram for explaining the hardware arrangement of an image forming apparatus according to the first embodiment.

A print data generation module 303 generates print data. The wireless communication unit 210 transmits the print data generated by the print data generation module 303 to the image forming apparatus 101. The image forming apparatus 101 that has received this print data stores the print data as storing printing print data in a large-volume storage unit (HDD) 411 (FIG. 4). Then, upon accepting an instruction to print stored print data from the user, the image forming apparatus 101 starts printing the data. An application storage module 304 temporarily stores various kinds of information. A scan job control module 305 gives a scan instruction to the image forming apparatus 101 via the wireless communication unit 210 and displays scan data received from the image forming apparatus 101. When the scan data is stored, it is stored in the application storage module 304. The stored scan data is managed by a document management module 306.

FIG. 4 is a block diagram for explaining the hardware arrangement of the image forming apparatus 101 according to the first embodiment.

A CPU 402 controls the operation of the image forming apparatus 101 by deploying programs stored in a ROM 403 or the HDD 411 such as a hard disk in a RAM 404 and executes the deployed programs. The CPU 402 comprehensively controls respective devices connected to a system bus 401. The RAM 404 functions as a main memory, a work area, and the like for the CPU 402. A console unit interface (I/F) 406 controls instruction inputs from various buttons, a console unit 407, and the like of the image forming apparatus 101. A display control unit 408 controls display on a display unit 409 such as a liquid crystal display or the like. A disk controller (DKC) 410 controls processing of reading/writing data from/in the HDD 411. A network interface card (NIC) 405 bidirectionally exchanges data with another network apparatus, a file server, or the like via the network 104. A wireless communication unit (WLAN) 415 is connected to an access point or operates in an access point mode, allowing the image forming apparatus 101 to operate as an access point and perform direct wireless communication connection to the mobile terminal 102. A printer unit 412 prints an image on a sheet by, for example, an electrophotographic method. Note that a printing method is not limited to the electrophotographic method and may be an inkjet method or the like. A scanner unit 413 is an image reading unit for reading an image on an original. In many cases, an ADF (Auto Document Feeder) (not shown) is optionally attached to the scanner unit 413, and a plurality of originals can be scanned automatically. Note that the HDD 411 may also be used as a temporary storage location of an image in some cases. A Bluetooth I/F 414 is an interface that performs wireless communication in accordance with the Bluetooth standard and mutually communicates with another apparatus including a Bluetooth I/F. In the first embodiment, the Bluetooth I/F 414 mutually communicates with the mobile terminal 102 in accordance with the Bluetooth standard.

Figure 5:
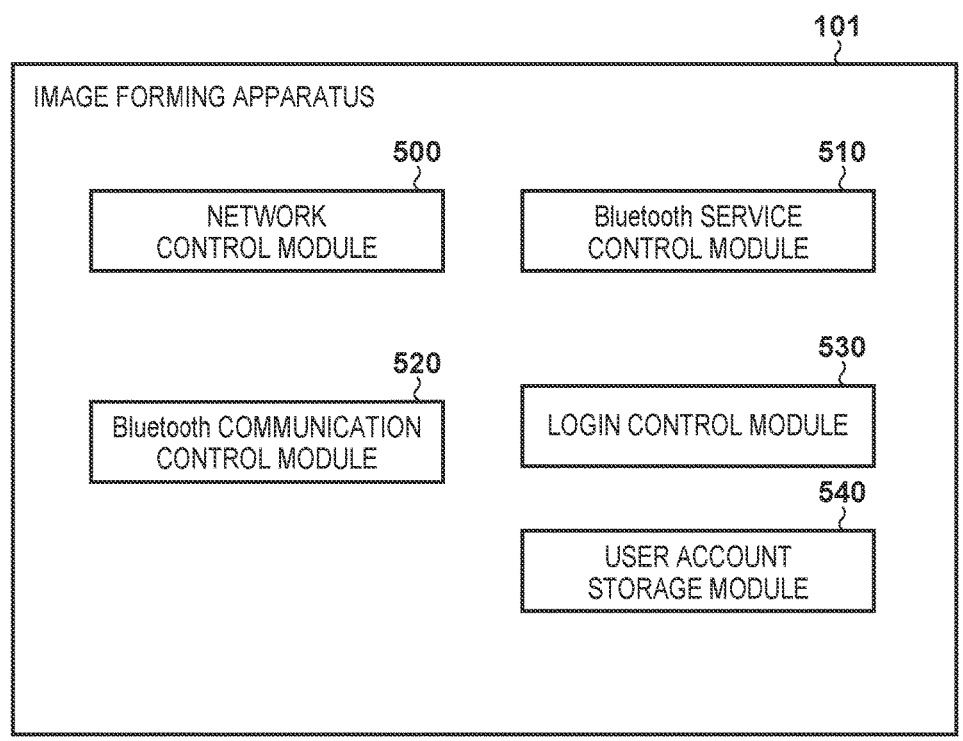
FIG. 5 is a block diagram for explaining the software arrangement of the image forming apparatus according to the first embodiment.

FIG. 5 is a functional block diagram for explaining the software arrangement of the image forming apparatus 101 according to the first embodiment. This software is stored in the ROM 403 and executed by the CPU 402.

A Bluetooth communication control module 520 is a device driver that controls the Bluetooth I/F 414 and controls data communication with the mobile terminal 102. Data received via the Bluetooth communication control module 520 is passed to and processed by a Bluetooth service control module 510. A user account storage module 540 is a data area where user information (a user name and a domain name) is stored. A login control module 530 is a module that provides a login function of authenticating a user when the user uses the image forming apparatus 101. The user account storage module 540 is a database that manages/stores the user information (the user name and the domain name) of each user, and this is recorded in the ROM 403 or the HDD 411. The user account storage module 540 uses a stored user account to provide a login service for the image forming apparatus 101 to external apparatuses. The login control module 530 performs login processing in accordance with an instruction from the Bluetooth service control module 510. A network control module 500 is a module for controlling the NIC 405. In addition, a printer module that controls the printer unit 412 and a scanner module that controls the scanner unit 413 also exist though they are not shown.

FIGS. 6A to 6D depict views each showing an example of a UI screen displayed on the operation panel 205 by the cooperative application 300 of the mobile terminal 102 according to the first embodiment.

Figure 6A:
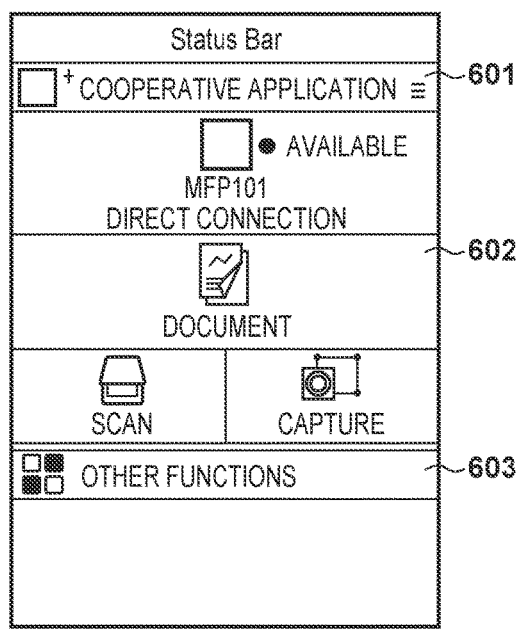
FIGS. 6A to 6D depict views each showing an example of a UI screen displayed on an operation panel by a cooperative application of the mobile terminal according to the first embodiment.

A main screen in FIG. 6A is displayed by activating the cooperative application 300 on the mobile terminal 102. The user causes a screen to transition to individual screens of various functions from this main screen, and sets and edits the various functions. However, details thereof will be omitted, and only a description related to the embodiment will be given.

Figure 6B:
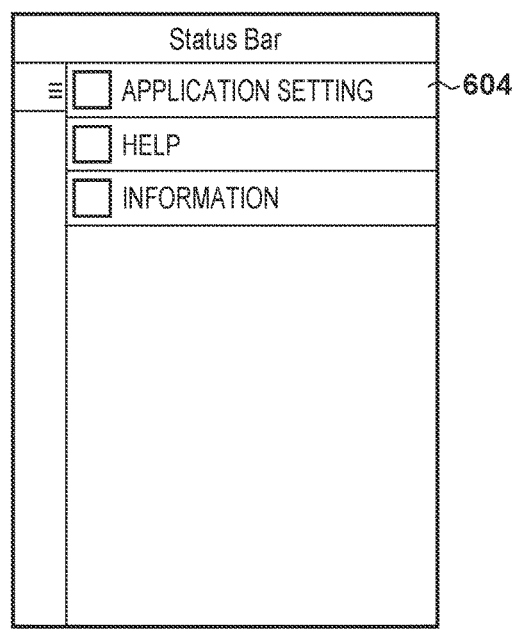
Figure 9A:
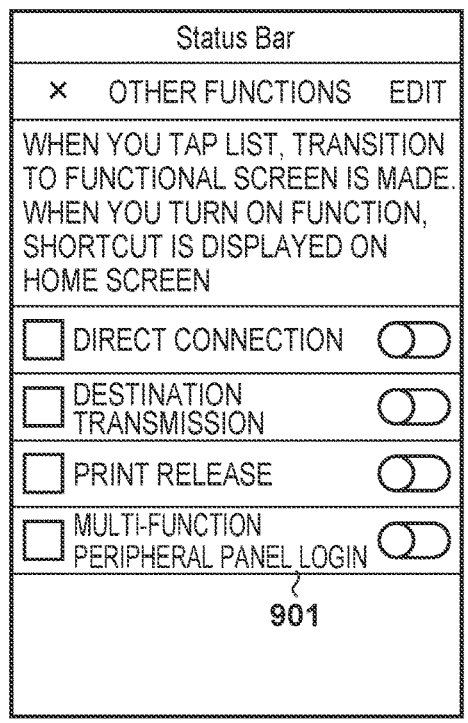
FIGS. 9A to 9D depict views each showing an example of a UI screen of a panel login function displayed on the mobile terminal according to the first embodiment.

FIG. 6A shows an example of the main screen displayed by the cooperative application 300. A "setting menu" screen in FIG. 6B is displayed by touching a menu region 601. When the user touches a "document" button 602 in FIG. 6A, transition to a screen (FIG. 7A) for accessing various documents held by the mobile terminal 102 is made. When the user touches "other functions" button 603 in FIG. 6A, transition to "other functions" screen in FIG. 9A is made.

FIG. 6B shows an example of the "setting menu" screen. The user can open an application setting screen, an application help screen, or the like by selecting a menu item on this screen. When the user touches an "application setting" button 604 out of items displayed on this screen, transition to an "application setting" screen in FIG. 6C is made.

Figure 6C:
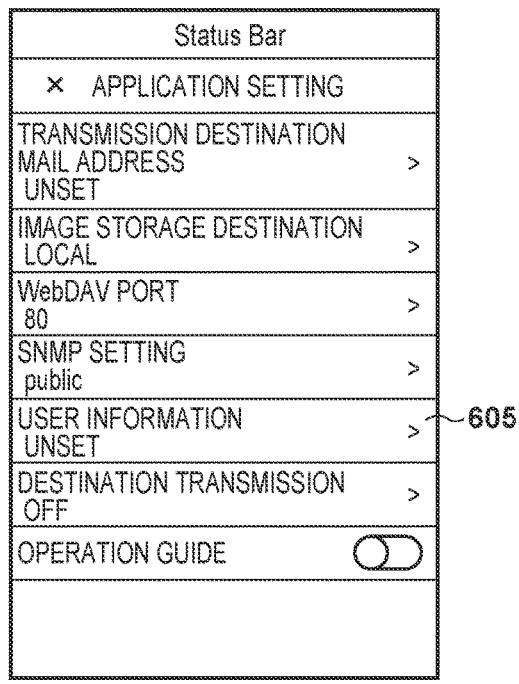

FIG. 6C shows an example of the "application setting" screen. On this screen, it is possible to set a detailed setting used in each function of the cooperative application 300. When the user touches a "user information" button 605 as one item of setting items here, the mobile terminal 102 changes display to a "user information" screen in FIG. 6D.

Figure 6D:
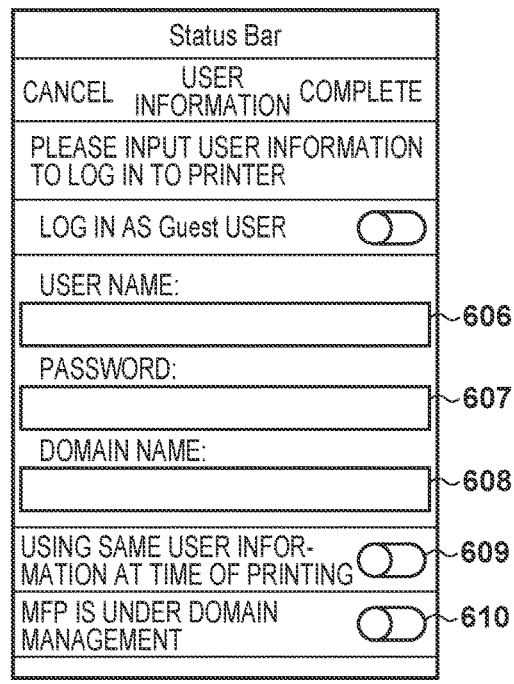

FIG. 6D shows an example of the "user information" screen. On this screen, it is possible to set user information used in various functions of the cooperative application 300 and store in the RAM 203. In the first embodiment, user information used in the storing printing function and the panel login function is set on this screen. It is possible to set a user name in a user name field 606, a password in a password field 607, and a document name in a document name field 608. Note that a password setting can be omitted. This is because the image forming apparatus 101 may not perform user management using a password (perform user management with only a user name). If the image forming apparatus 101 applies domain authentication by using the LDAP server for user authentication, a domain name needs to be set for the panel login function. For the domain name set at this time, a domain name used for user management is set in the LDAP server. If the image forming apparatus 101 uses local device authentication based on the user account information stored in the main body for user authentication, a domain name need not be input.

A "using the same user information at the time of printing" button 609 is a setting item that switches whether to use information set on this "user information" screen when a storing printing job is input. If the "using the same user information at the time of printing" button 609 is set on, it is possible to link the user information input in FIG. 6D and user information used for storing printing to be described later to each other. Note that it is also possible to individually set the user information set for the storing printing job in a user name field 706 and a domain name field 707 on an "output method" screen of FIG. 7D to be described later.

In the storing printing, when printing is performed from a plurality of terminals such as a PC, a mobile terminal, and the like owned by the user, it may be more convenient to be able to manage print data stored as a job of the same user. In this case, by setting user information (a user name and a domain name) usually used in the PC as user information used in the storing printing function, the user can use storing printing with the same sense as a case in which the user information is input from the PC.

On the other hand, a case in which user information is to be unitarily managed in the setting of the "user information" screen in order to save time and effort in inputting the user information is considered.

The user can link panel login user information input in FIG. 6D to the user information used for storing printing by setting the "using the same user information at the time of printing" button 609 on. When the "using the same user information at the time of printing" button 609 is set on, based on the user information input in FIG. 6D, the mobile terminal 102 overwrites storing printing user information set on the "output method" screen in FIG. 7D. In this case, by setting the same domain name as a PC capable of inputting a storing printing job under domain management in the document name field 608, it is possible to manage the storing printing job in the same job list as the PC.

However, there is a case in which it is simply inconvenient if the panel login user information and the storing printing user information are linked to each other. This is because user information for specifying the owner of print data in the storing printing function and user information for uniquely identifying a user who logs in to the image forming apparatus in the panel login function are different in usage though they are the same setting item as described above.

For example, a case in which the image forming apparatus adopts local device authentication that manages the user in the image forming apparatus as the mechanism of user authentication at the time of login will be considered. In this case, an image forming apparatus that has received user information from the mobile terminal tries to perform user authentication by using an external authentication server based on a domain name. However, a setting for using the external authentication server is not made, making it impossible to authenticate a user using the external authentication server. Therefore, panel login to the image forming apparatus may fail.

In the first embodiment, in consideration of the above-described problems, a function of appropriately switching user information used for cooperation is provided in the mobile terminal 102 cooperating with the image forming apparatus 101. More specifically, a button 610 that selects whether "MFP is under domain management" is provided on the screen of FIG. 6D and in accordance with an instruction of this button 610, the user information used at the time of cooperation is switched appropriately while unitarily managing the user information.

The "MFP is under domain management" button 610 instructs whether the image forming apparatus 101 to be logged in by using the panel login function is under domain management. If the image forming apparatus 101 to be logged in is set to perform user authentication by the external authentication server, the user turns on this button 610. On the other hand, if the image forming apparatus 101 performs local device authentication that performs user management by itself, the user turns off this button 610.

If the "MFP is under domain management" button 610 is ON, the cooperative application 300 executes the panel login function by using the domain name set in the document name field 608. This allows the image forming apparatus 101 to perform, based on a domain name and user ID input by the user, user authentication using the external authentication server.

On the other hand, if the "MFP is under domain management" button 610 is OFF, the cooperative application 300 executes the panel login function without using the domain name set in the document name field 608. With this processing, while unitarily managing the user information, it is possible to perform control so as to perform panel login without using domain information which is inconvenient if linked in a case in which the image forming apparatus 101 uses local device authentication. Information indicating ON/OFF of the button 609 and 610 is stored in the RAM 203.

A print function, the panel login function, and control for appropriately switching user information used in the functions will be described below in detail with reference to screen examples of the cooperative application 300 and flowcharts.

FIGS. 7A to 7D depict views each showing an example of a UI screen of the print function in the cooperative application 300 according to the first embodiment. This screen is used when a storing printing job is to be input from the cooperative application 300.

Figure 7A:
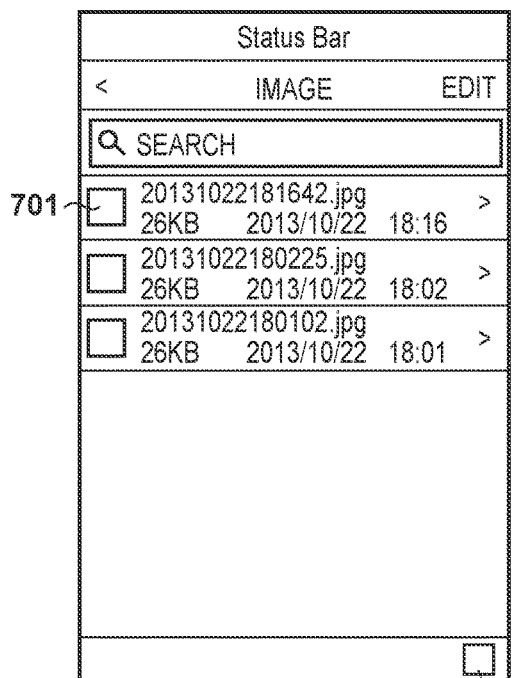
FIGS. 7A to 7D depict views each showing an example of a UI screen of a print function in the cooperative application according to the first embodiment.

FIG. 7A shows an example of a screen on which documents held by the mobile terminal 102 are listed. A document to undergo storing printing is selected in a check box 701. Transition to a screen in FIG. 7B is made by selecting a check box 702.

Figure 7B:
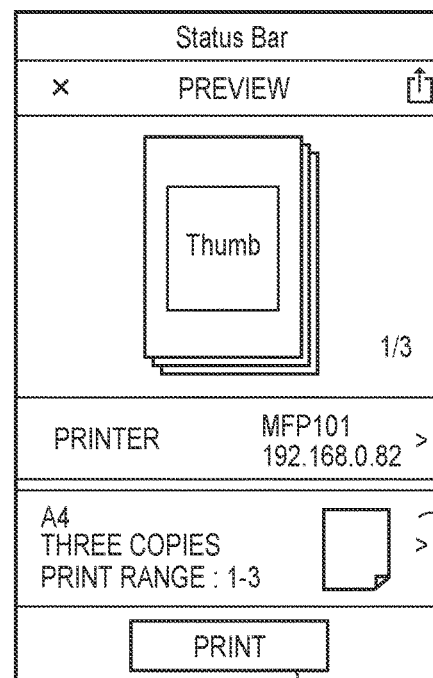

FIG. 7B shows an example of a "print preview" screen that displays a preview when the image forming apparatus 101 prints the document selected in FIG. 7A. On this screen, it is also possible to edit a print setting when the image forming apparatus 101 performs printing, and transition to a "print setting" screen shown in FIG. 7C can be made by touching a button 703. Transition to a "under printing" screen in FIG. 8 is made by touching a "print" button 704, making it possible to input the storing printing job to the image forming apparatus 101.

Figure 7C:
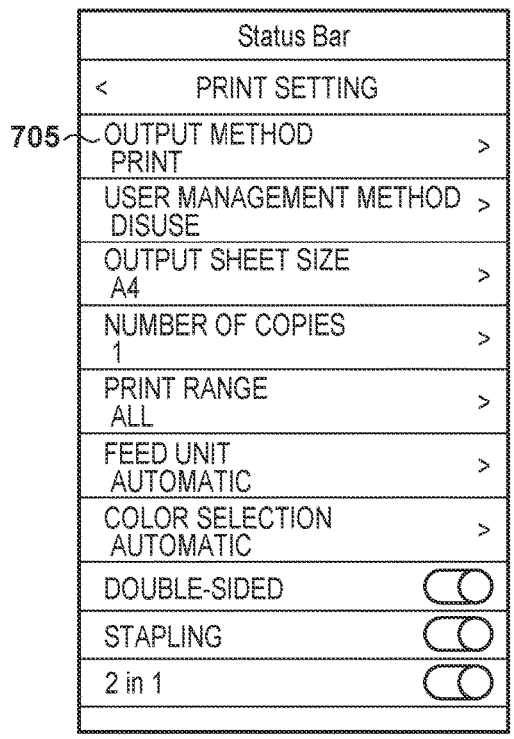

FIG. 7C shows an example of a "print setting" screen of the storing printing job. On this screen, it is possible to set various print settings. However, a detailed description thereof will be omitted. Transition to the "output method" screen in FIG. 7D is made by selecting an "output method" button 705.

Figure 7D:
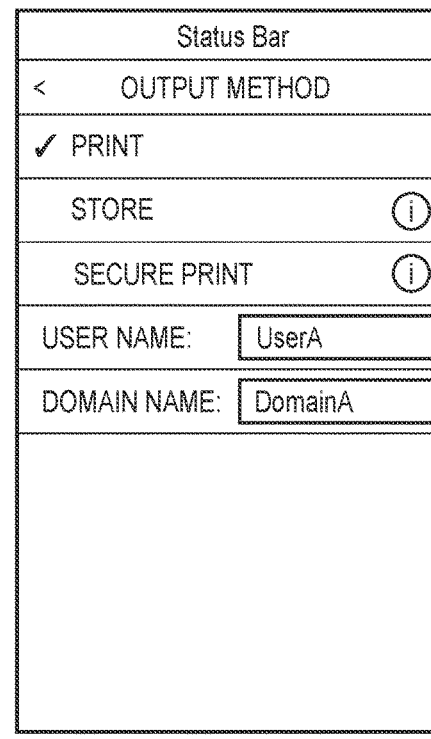

FIG. 7D shows an example of the "output method" screen. It is possible here to set user information given to the storing printing job. A user name and a domain name can be designated for the user information. The user can set the user name in the user name field 706 and set the domain name in the domain name field 707. Similarly to the document name field 608 in FIG. 6D, by instructing the same domain name as the PC capable of inputting a storing printing job under domain management for the domain name field 707, it is possible to manage the storing printing job in the same job list as the PC. The same domain name need not be set in a case in which, for example, the storing printing job is to be managed in another job list by using another domain name which is not to be managed in the same job list as the PC. Note that as described above, if the "using the same user information at the time of printing" button 609 in FIG. 6D is set on, the settings of the user name field 606 and document name field 608 are used in the storing printing job. In this case, the user name field 706 and the domain name field 707 are overwritten with the settings of the user name field 606 and document name field 608.

Figure 8:
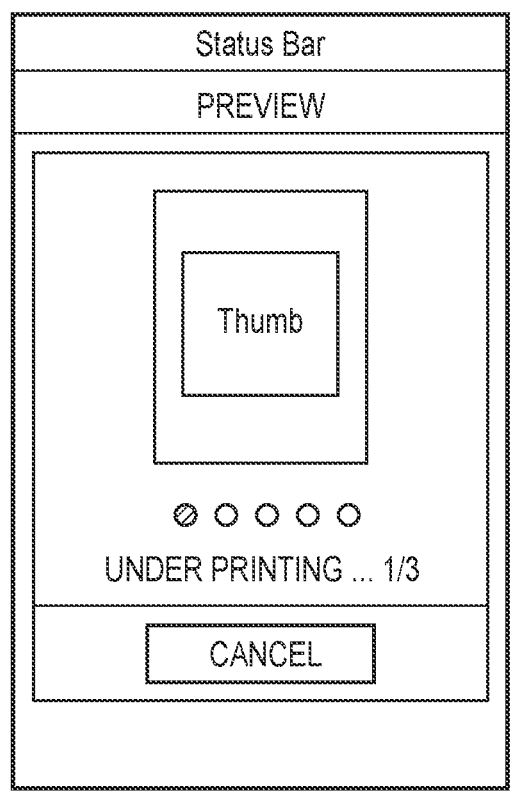
FIG. 8 depicts a view showing an example of an "under printing" screen by the cooperative application according to the first embodiment.

FIG. 8 depicts a view showing an example of a UI screen of the print function in the cooperative application 300 according to the first embodiment and is a view showing an example of the "under printing" screen where the storing printing job is input and executed. This screen is displayed on the operation panel 205 until the input of the storing printing job is complete and returns to the screen in FIG. 7A again after the completion.

FIGS. 9A to 9D depict views each showing an example of a UI screen of the panel login function displayed by the mobile terminal 102 according to the first embodiment. This screen is displayed when the panel login function is executed on the operation panel 205.

FIG. 9A shows an example of the "other functions" screen. The screen is displayed when the user touches the "other functions" button 603 in FIG. 6A. On this screen, it is possible to select and execute a function executable as other functions. However, a detailed description thereof will be omitted. Transition to a "multi-function peripheral panel login" screen in FIG. 9B is made by selecting a "multi-function peripheral panel login" button 901 here.

Figure 9B:
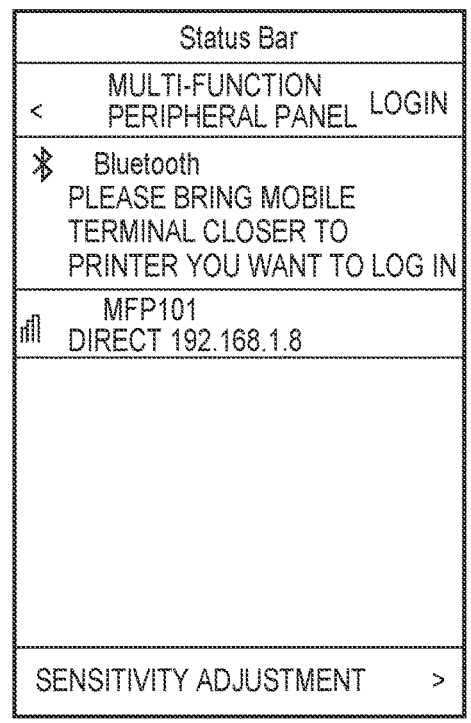

FIG. 9B shows an example of the "multi-function peripheral panel login" screen. On this screen, whether an image forming apparatus registered in the cooperative application 300 is present nearby is detected by using Bluetooth. Then, if the image forming apparatus present nearby is detected, user information is transmitted to the image forming apparatus to perform login authentication. At this time, in the first embodiment, the user name and the domain name are transmitted if the "MFP is under domain management" button 610 in FIG. 6D is ON, and the domain name is not transmitted if the button 610 is OFF. That is, if the button 610 in FIG. 6D is set off, only the user name is transmitted. Note that if a password is set as "user information" on the screen of FIG. 6D, the "password" is also transmitted together with a "user name".

Figure 9C:
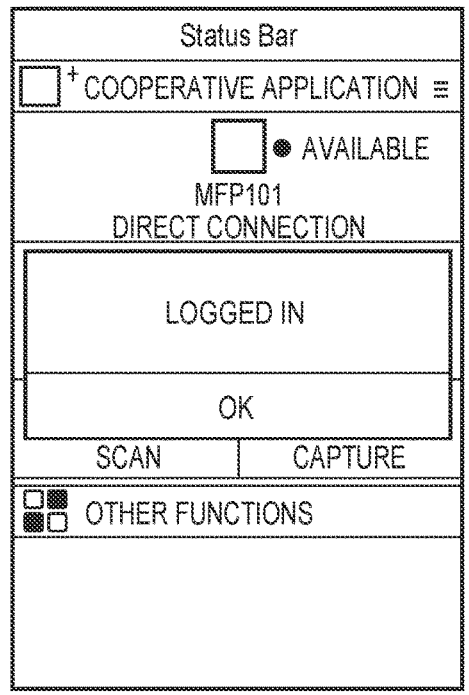

FIG. 9C shows an example of a "multi-function peripheral panel login success" screen which is displayed if login to the image forming apparatus 101 succeeds with the user information transmitted in FIG. 9B.

Figure 9D:
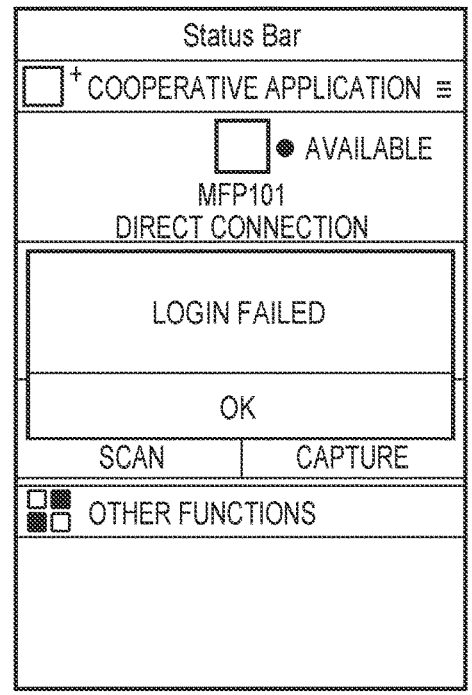

FIG. 9D shows an example of a "multi-function peripheral panel login failure" screen which is displayed if login to the image forming apparatus 101 fails with the user information transmitted in FIG. 9B.

Figure 10:
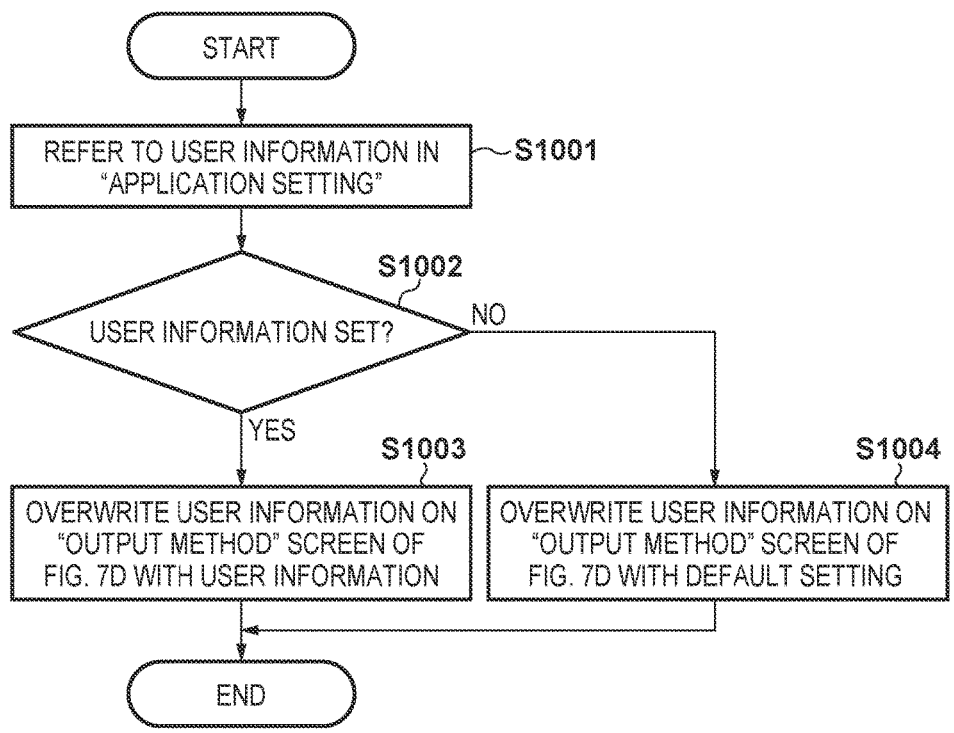
FIG. 10 is a flowchart for describing user information takeover processing by the cooperative application of the mobile terminal according to the first embodiment.

FIG. 10 is a flowchart for describing user information takeover processing by the cooperative application 300 of the mobile terminal 102 according to the first embodiment. This processing is started when the "using the same user information at the time of printing" button 609 in FIG. 6D is set on, and the setting is stored. Note that this processing is achieved by causing the CPU 201 to deploy control programs stored in the ROM 202 or the HDD 204 in the RAM 203 and execute the programs.

When the processing is started, in step S1001, the CPU 201 refers to the user name of the user name field 606 and the domain name of the document name field 608 out of the user information set on the screen of FIG. 6D and stored in the RAM 203. Next, the process advances to step S1002 in which the CPU 201 determines whether or not the user name and the domain name are set. If the CPU 201 determines here that the user name and the domain name are set, the process advances to step S1003. If nothing is set in particular, the process advances to step S1004. In step S1003, the CPU 201 applies the user name and the domain name referred to in step S1001 to the user name field 706 and domain name field 707 on the "output method" screen of FIG. 7D, overwrites them, and terminates this processing.

On the other hand, in step S1004, the CPU 201 applies a user name and a domain name held by default to the user name field 706 and domain name field 707 on the "output method" screen of FIG. 7D, overwrites them, and terminates this processing.

In the first embodiment, a mobile terminal name (such as "smartphone of UserA" or "Nexsus7") is applied to a default user name, and a default domain name is treated as a blank with nothing being applied to it. Note that in this case, the storing printing job input from the mobile terminal 102 does not include information on the domain name, making it impossible to manage a job in the same job list as the PC 103.

With the above processing, the user information takeover processing by the cooperative application 300 on the mobile terminal 102 is performed.

Figure 11:
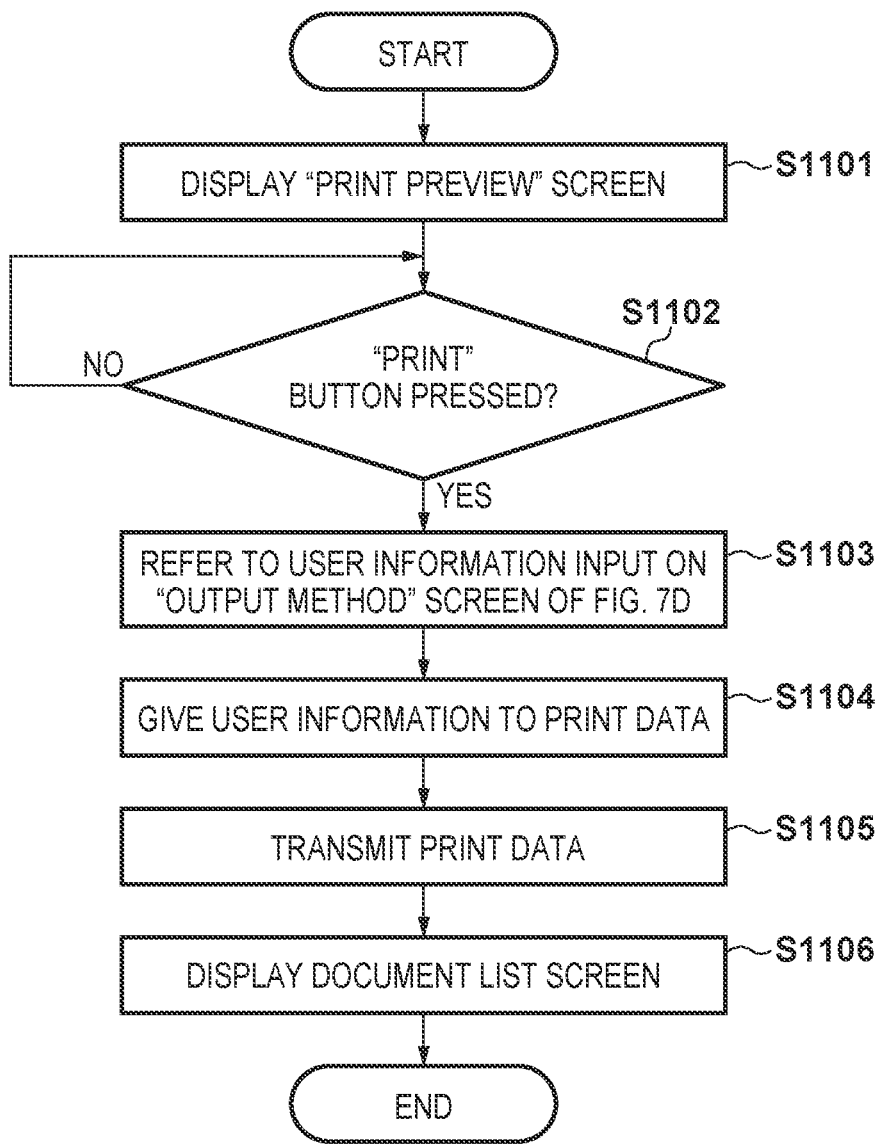
FIG. 11 is a flowchart for describing storing printing job input processing by the cooperative application on the mobile terminal according to the first embodiment.

FIG. 11 is a flowchart for describing storing printing job input processing by the cooperative application 300 on the mobile terminal 102 according to the first embodiment. This processing is started when the user selects a document in FIG. 7A and selects the check box 702. Note that this processing is achieved by causing the CPU 201 to execute the deployed control programs.

First, in step S1101, the CPU 201 displays the "print preview" screen shown in FIG. 7B. Next, the process advances to step S1102 in which the CPU 201 determines whether or not the "print" button 704 in FIG. 7B is pressed. If the CPU 201 determines here that the "print" button 704 is pressed, the process advances to step S1103; otherwise, the process returns to step S1102 to repeat the process. In step S1103, the CPU 201 refers to the values of the user name field 706 and domain name field 707 input on the "output method" screen of FIG. 7D. Then, the process advances to step S1104 in which the CPU 201 gives the user name and domain name referred to in step S1103 to print data as user information for the print data. Then, the process advances to step S1105 in which the CPU 201 transmits the print data to the image forming apparatus 101. Then, the process advances to step S1106 in which the CPU 201 displays an original document list display screen in FIG. 7A and terminates this processing. Note that in this embodiment, print data is transmitted to an image forming apparatus (here, the image forming apparatus 101) of a cooperation destination by using wireless communication complying with 802.11.

With the above processing, it is possible to input the storing printing job to the image forming apparatus 101 by the cooperative application 300 executed on the mobile terminal 102.

Figure 12:
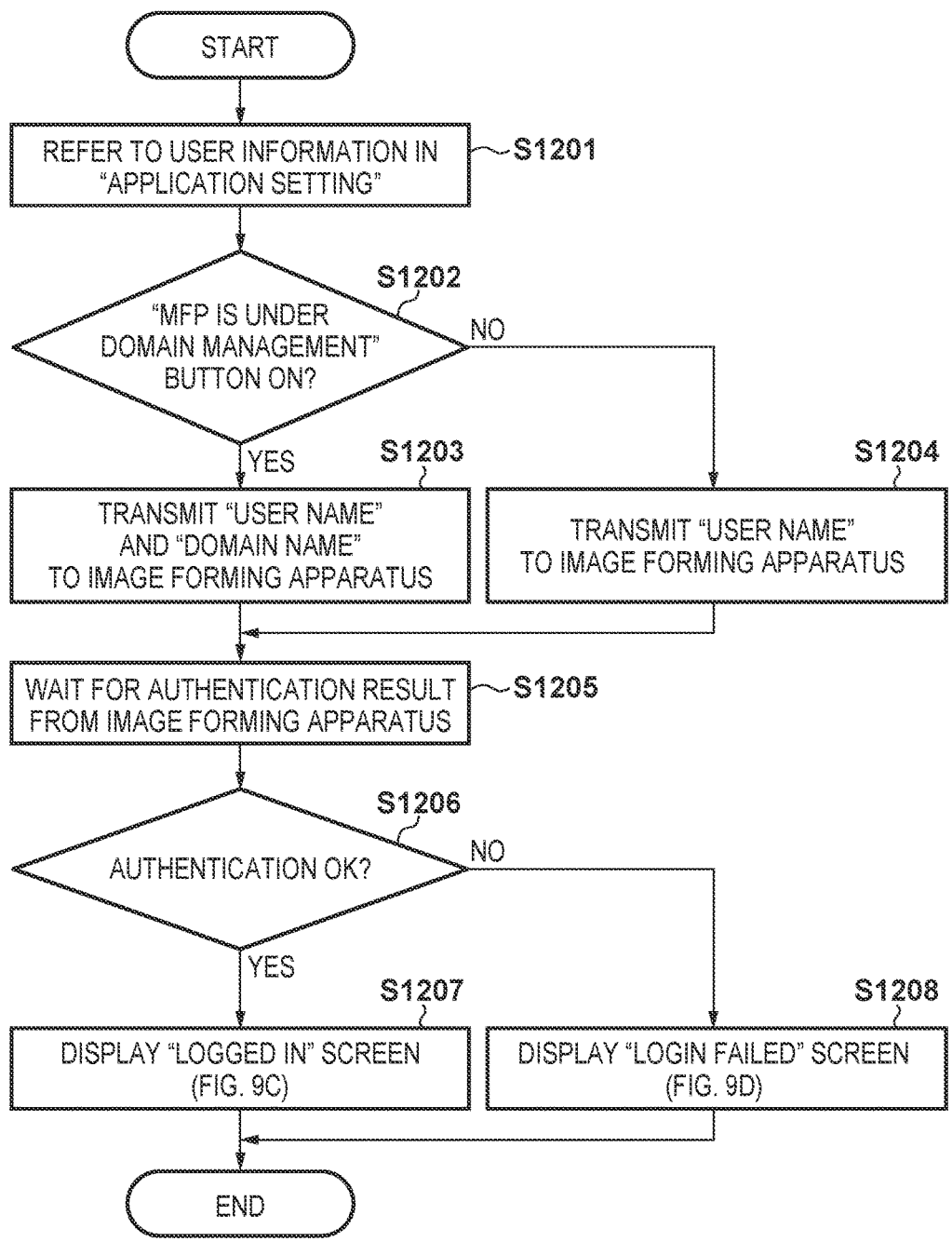
FIG. 12 is a flowchart for describing panel login processing by the cooperative application on the mobile terminal according to the first embodiment.

FIG. 12 is a flowchart for describing panel login processing by the cooperative application 300 on the mobile terminal 102 according to the first embodiment. This processing is started when the mobile terminal 102 detects the image forming apparatus 101 present nearby by Bluetooth on the "multi-function peripheral panel login" screen of FIG. 9B. Note that this processing is achieved by causing the CPU 201 to deploy control programs stored in the ROM 202 or the HDD 204 in the RAM 203 and execute the programs.

First, in step S1201, the CPU 201 refers to the user name field 606, password field 607, and document name field 608 set on the screen of FIG. 6D and stored in the RAM 203. Next, the process advances to step S1202 in which the CPU 201 determines whether or not the "MFP is under domain management" button 610 is set to be ON on the screen of FIG. 6D based on the information stored in the RAM 203. When the button 610 is set to be ON here, the process advances to step S1203; otherwise, the process advances to step S1204. In step S1203, the CPU 201 transmits a login request that includes the user name and domain name referred to in step S1201 to the image forming apparatus 101, and the process advances to step S1205. Note that at this time, if a password is stored in the password field 607, the CPU 201 transmits a user name, a domain name, a password, and a login request that includes a domain name to the image forming apparatus 101. On the other hand, in step S1204, the CPU 201 transmits a login request that includes the user name referred to in step S1201 to the image forming apparatus 101, and the process advances to step S1205. Therefore, in this case, the CPU 201 does not transmit a domain name. Note that at this time, if the password is stored in the password field 607, the CPU 201 transmits the login request that includes the user name and the password to the image forming apparatus 101.

In step S1205, the CPU 201 waits for the reception of a login authentication result by the image forming apparatus 101. When the login authentication result is received, the process advances to step S1206.

At this time, the image forming apparatus 101 determines whether or not to permit login of the user based on the login request received from the mobile terminal 102. If the image forming apparatus 101 applies domain authentication and accepts the login request that includes the domain name, the image forming apparatus 101 transmits the domain name and the user information to the external authentication server, and inquires whether to permit login of the user and determines whether or not to permit the login based on an inquiry result. On the other hand, if the image forming apparatus 101 accepts the login request that does not include the domain name, the image forming apparatus 101 decides whether or not to permit login of the user based on the user account storage module 540 in the image forming apparatus 101. Note that if the user's login from the mobile terminal 102 is permitted, the image forming apparatus 101 displays a main screen (not shown) on the console unit 407. The user can use the respective functions (a copy function, a scan data transmission function, the storing printing function, and the like) of the image forming apparatus 101 via the main screen displayed on the console unit 407. Further, the image forming apparatus 101 transmits login authentication result as a response to the login request.

In step S1206, the CPU 201 determines whether the login authentication result received in step S1205 indicates success. If login authentication succeeds here, the process advances to step S1207 in which the CPU 201 displays the "multi-function peripheral panel login success" screen shown in FIG. 9C and terminates this processing. On the other hand, if login authentication fails, the process advances from step S1206 to step S1208 in which the CPU 201 displays the "multi-function peripheral panel login failure" screen shown in FIG. 9D and terminates this processing.

With the above processing, panel login processing by the cooperative application 300 on the mobile terminal 102 is performed.

As described above, according to the first embodiment, it is possible to cause the image forming apparatus to hold a user name and a domain name as user information in an application that operates on a mobile terminal capable of performing both storing printing and panel login. Furthermore, if the user wants to log in to the image forming apparatus by using the panel login function, an item capable of designating whether the image forming apparatus is under domain management is provided, and in accordance with the designation, user information used at the time of panel login can be switched.

This makes it possible to appropriately switch whether to use a domain name depending on a cooperative function while unitarily managing user information used in various cooperative functions with the image forming apparatus.

Furthermore, it is possible to store, in the same job list, storing printing jobs input from a PC, a mobile terminal, and the like to the image forming apparatus that adopts local device authentication for user authentication while allowing panel login to the image forming apparatus.

Second Embodiment

In the above-described first embodiment, an item that sets the use environment of an image forming apparatus performing functional cooperation with a mobile terminal is provided and by this setting item, user information used for each function is switched in the application of the mobile terminal. As a detailed example of this, whether to include a domain name in user information used in the panel login function is switched depending on whether the image forming apparatus is under domain management. Then, if the image forming apparatus is not under domain management, switching can be performed without including the domain name in the user information at the time of panel login, allowing panel login to the image forming apparatus.

However, this allows only login to the image forming apparatus. Even if a storing printing function is to be executed after login, it is impossible to make a notification of a domain name at the time of login in the first embodiment. It is therefore impossible to, for example, obtain a job list linked to the domain name on the side of the image forming apparatus.

On the other hand, if the notification of the domain name is made by another means to log in to the image forming apparatus, the login can be performed by, for example, holding an authentication card with the domain name over the image forming apparatus or inputting user information with the domain name directly from a login screen. In this case, it becomes possible to obtain the job list linked to the domain name. As one use case, an environment is considered in which an apparatus such as a PC that usually performs printing is under domain management for the purpose of, for example, access management to a shared folder, and the image forming apparatus is not under domain management. The image forming apparatus which is not under domain management has a function of automatically registering a user who newly uses the image forming apparatus as a mechanism that reduces efforts of registering and managing the user. As a function of this, there is a method of automatically registering a user account by using user information included in print data when the print data is input from a client PC. In this case, an image forming apparatus that has received the print data internally generates a user identifier for identifying a user uniquely. The user identifier has a format of, for example, "(user name)@(domain name)" or the like. The user name is, for example, the name of a user who is logging in to a PC that has transmitted print data, and the domain name is the name of a domain joined by the PC. If the user specified by the user identifier is not registered in a user account storage module 540, the image forming apparatus newly registers, based on the user identifier, a user capable of using the image forming apparatus. Therefore, if user management is performed in such a mode, a user name stored in the user account storage module 540 has the format of, for example, "(user name)@(domain name)" or the like. Even if user management is performed in such a mode as well, a case in which the storing printing function and the panel login function are to be used by using the same user information is considered.

Therefore, in the second embodiment, an example will be described in which it becomes possible to execute a panel login function from a mobile terminal to an image forming apparatus that adopts the above-described user registration method and obtain a job list linked to a domain name. For this purpose, the mobile terminal generates a new user name according to the rule of the above-described user registration method that automatically includes information on the domain name in the user name if the image forming apparatus is under domain management at the time of panel login. Then, login authentication is performed by the user name that includes the information on the domain name at the time of panel login, and when a job list is obtained subsequently, the image forming apparatus obtains the job list by using the information on the domain name included in the user name.

For example, if the image forming apparatus stores print data in a storage, it internally generates a user identifier based on user information included in received print data. The user identifier has a format of, for example, "(user name)@(domain name)" or the like. This user identifier is used in order to uniquely identify a user who has transmitted the print data. When the mobile terminal logs in to the image forming apparatus which is not under domain management, the mobile terminal performs login processing without transmitting the domain name as in the first embodiment. At this time, however, the mobile terminal internally generates a new user name "(user name)@(domain name)" that includes a domain name in a user name and transmits the new user name to the image forming apparatus. Then, the image forming apparatus determines whether there is an identifier that matches a user identifier held inside from the received user name "(user name)@(domain name)" and obtains a job list.

This allows panel login to the image forming apparatus that adopts the above-described user registration method and makes it possible to obtain a job list for storing printing after panel login. Note that the hardware arrangements and the like of an image forming apparatus 101 and mobile terminal 102 according to the second embodiment are the same as in the aforementioned first embodiment, and thus a description thereof will be omitted.

Figures 13, 14:
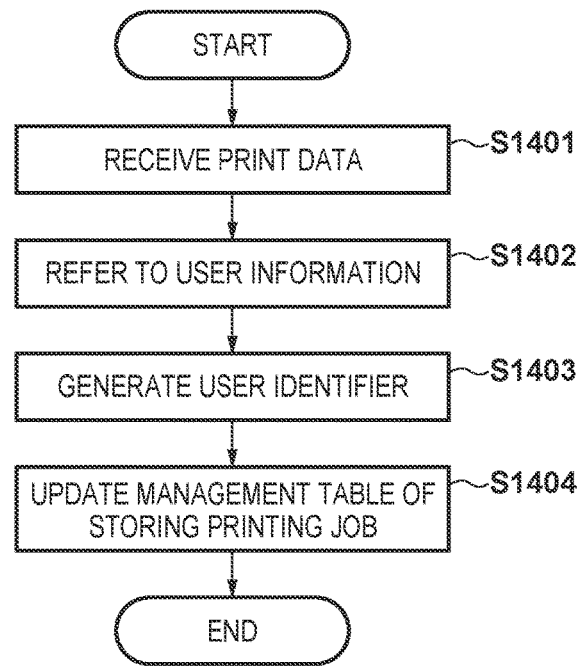
FIG. 13 depicts a view illustrating an example of a management table of a storing printing job managed by an image forming apparatus according to the second embodiment.
FIG. 14 is a flowchart for describing storing printing job reception processing by the image forming apparatus according to the second embodiment.

FIG. 13 depicts a view illustrating an example of a management table of a storing printing job managed by the image forming apparatus 101 according to the second embodiment.

In this management table, it is possible to specify a print job of the user by a user identifier. When the image forming apparatus 101 receives storing printing data, the user identifier is generated based on given user information. For example, the generated user identifier, a user name, a domain name, and a pointer indicating the storage destination of the print data are managed in the management table. FIG. 13 shows an example of a management table of a storing printing job of a user having a user name "UserA". A job list input from a mobile terminal having a domain name set to "DomainA" is shown here. Print jobs are four print jobs of AAAAA.prn, BBBBB.prn, FFFFF.prn, and GGGGG.prn, and all of them are managed collectively by a user identifier "UserA@DomainA".

FIG. 14 is a flowchart for describing storing printing job reception processing by the image forming apparatus 101 according to the second embodiment. This flowchart is started by receiving a storing printing job from the mobile terminal 102. Note that this processing is achieved by causing a CPU 402 to deploy control programs stored in the HDD 411 in the RAM 404 and execute the programs.

First, in step S1401, the CPU 402 receives print data of a storing printing job transmitted from the mobile terminal 102. The received print data is stored in a predetermined area in the RAM 203 or the HDD 204. Next, the process advances to step S1402 in which the CPU 402 refers to user information given to the received print data. Then, the process advances to step S1403 in which the CPU 402 generates a job identifier based on the user information referred to in step S1402. In the second embodiment, a user identifier "(user name)@(domain name)" is generated from a user name and a domain name included in the user information. Then, the process advances to step S1404 in which the CPU 402 updates the management table of the storing printing job described with reference to FIG. 13. If a user specified by the user identifier is not registered in the user account storage module 540, the CPU 402 newly registers the account of the user who uses the image forming apparatus 101 with the user identifier as a user name.

With the above processing, the storing printing job reception processing by the image forming apparatus 101 according to the second embodiment is performed.

Figure 15:
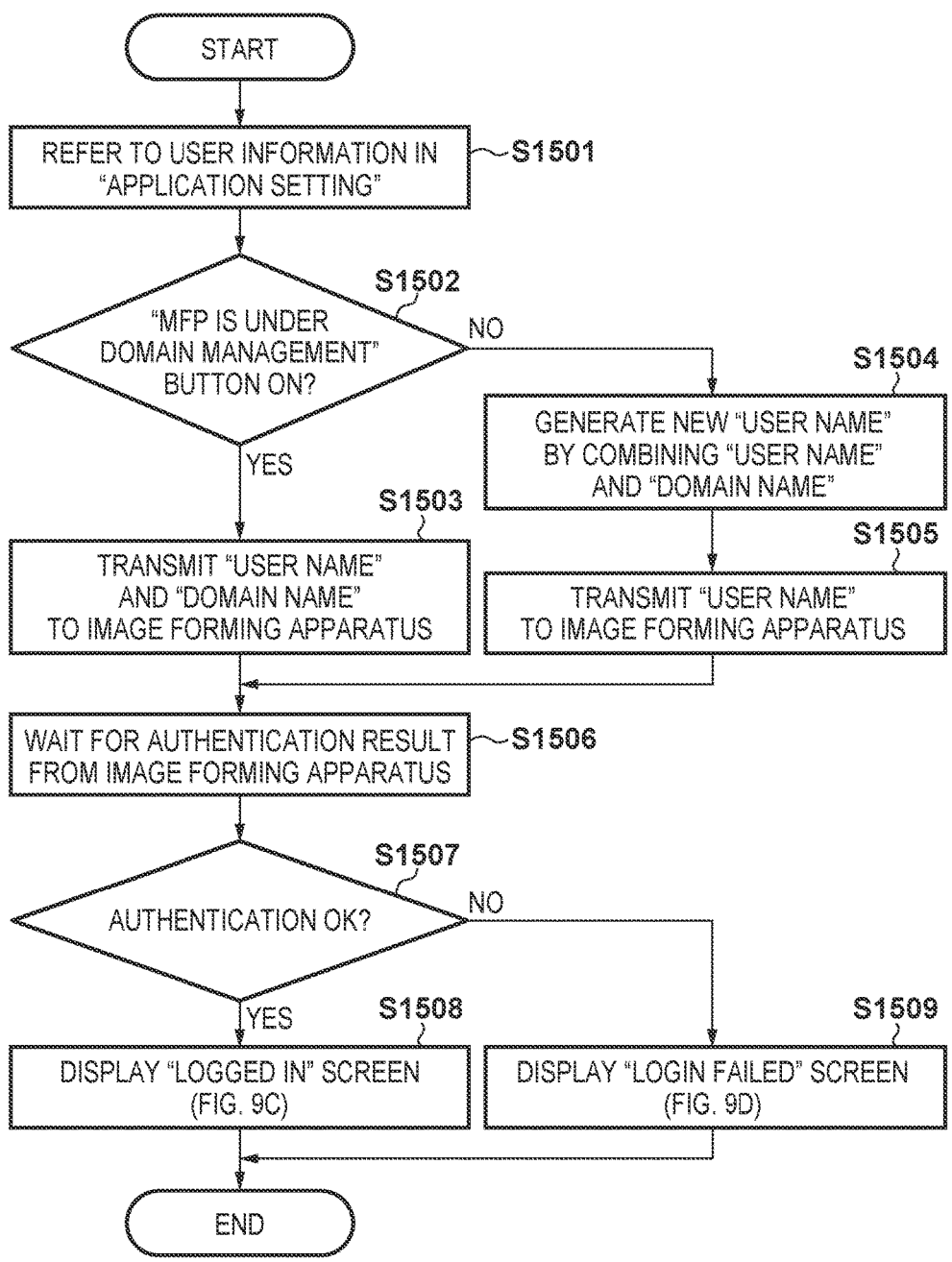
FIG. 15 is a flowchart for describing panel login processing by a cooperative application operating on a mobile terminal according to the second embodiment.

FIG. 15 is a flowchart for describing panel login processing by a cooperative application 300 operating on the mobile terminal 102 according to the second embodiment.

As described above, the image forming apparatus 101 according to the second embodiment internally generates a user identifier based on user information for login transmitted from the mobile terminal 102 at the time of panel login. Then, if the generated user identifier matches the user identifier managed in the management table, login of the user is permitted. If a "MFP is under domain management" button 610 is set on at the time of panel login, a user name and a domain name are transmitted from the mobile terminal 102. The image forming apparatus 101 combines the user name and the domain name at the time of the panel login to generate a user identifier, and permits login of the user if a user identifier that matches the generated user identifier exists in the management table. On the other hand, if the "MFP is under domain management" button 610 is set off, the mobile terminal 102 transmits a login request that includes a user name. In the second embodiment, however, the mobile terminal 102 transmits a login request that includes a domain name by setting the user name as "(user name)@(domain name)". Consequently, the image forming apparatus 101 determines whether an account that matches a user identifier matching the received user name is stored in the user account storage module 540 and permits login of the user if there is the user account that matches the user name.

Note that the panel login processing according to the second embodiment is different from the panel login processing described with reference to FIG. 12 of the aforementioned first embodiment only in processes (steps S1504 and S1505) if the "MFP is under domain management" button 610 is OFF. Therefore, steps S1501 to S1503 in FIG. 15 are the same as steps S1201 to S1203 in FIG. 12 of the first embodiment, and steps S1506 to S1509 are the same as steps S1205 to S1208 in FIG. 12, and thus a description thereof will be omitted.

In step S1504, a CPU 201 combines a user name in a user name field 606 and a domain name in a document name field 608 to generate a new user name "(user name)@(domain name)". Then, the process advances to step S1505 in which the CPU 201 transmits, to the image forming apparatus 101, a login request that includes the user name generated in step S1504 and does not include a domain name, and the process advances to step S1506. Note that if a password is set as "user information" on a screen of FIG. 6D, a login request that includes the "password" together with a "user name" is transmitted. In the second embodiment, processing of the image forming apparatus 101 that has received the login request is changed as follows. For example, the image forming apparatus 101 that has received the login request decides, based on the login request received from the mobile terminal 102, whether to permit login of the user. Processing for the login request that includes the domain name is the same as in the first embodiment, and thus omitted. The image forming apparatus 101 of the second embodiment decides whether to permit user authentication based on the user account storage module 540 in the apparatus 101 if it accepts the login request that does not include the domain name and based on the decision, decides whether to permit login. Note that the CPU 402 of the image forming apparatus 101 determines whether there is an account that matches the user name, that is, "(user name)@(domain name)" included in the login request. If there is the matching account, the CPU 402 decides, based on the account, whether to permit login. Furthermore, if there is no matching account, the CPU 402 extracts a character string before "@" and based on the extracted character string, determines whether there is a matching account. If there is the matching account, the CPU 402 decides, based on the account, whether to permit login.

The panel login processing by the cooperative application 300 operating on the mobile terminal 102 according to the second embodiment is thus performed.

According to the second embodiment, a user name that includes information on a domain name allows panel login to the image forming apparatus which is not under domain management. Therefore, based on user information included in print data, it also becomes possible to appropriately perform panel login to an image forming apparatus that automatically registers a user account under a naming rule of "(user ID)@(domain name)". Furthermore, it is possible to obtain a job list of the storing printing after panel login by using information on a domain name included in a user name.

Third Embodiment

In the above-described first and second embodiments, the item that sets the use environment of the image forming apparatus performing functional cooperation with the mobile terminal is provided and by this setting item, the user information used for each function is switched in the application on the mobile terminal. More specifically, the user explicitly sets, as an application setting, whether the image forming apparatus is under domain management on the mobile terminal and in accordance with the setting, switches whether to transmit a domain name at the time of panel login. By using a capability response function of the image forming apparatus such as MIB, however, whether the image forming apparatus is under domain management can also be obtained automatically by an application.

Hence, in the third embodiment, when a cooperative application of a mobile terminal performs panel login to an image forming apparatus, whether the image forming apparatus is under domain management is obtained automatically at the same time. Then, in accordance with the obtaining result, user information transmitted to the image forming apparatus is changed. If an image forming apparatus 101 is under domain management, a domain name set in a cooperative application 300 is replaced by an internally correct domain name if the domain name is not correct as the domain name of the image forming apparatus 101 to be logged in. Alternatively, a pop-up menu that prompts the resetting of a domain name may be displayed on the UI screen of the cooperative application 300.

Figure 16:
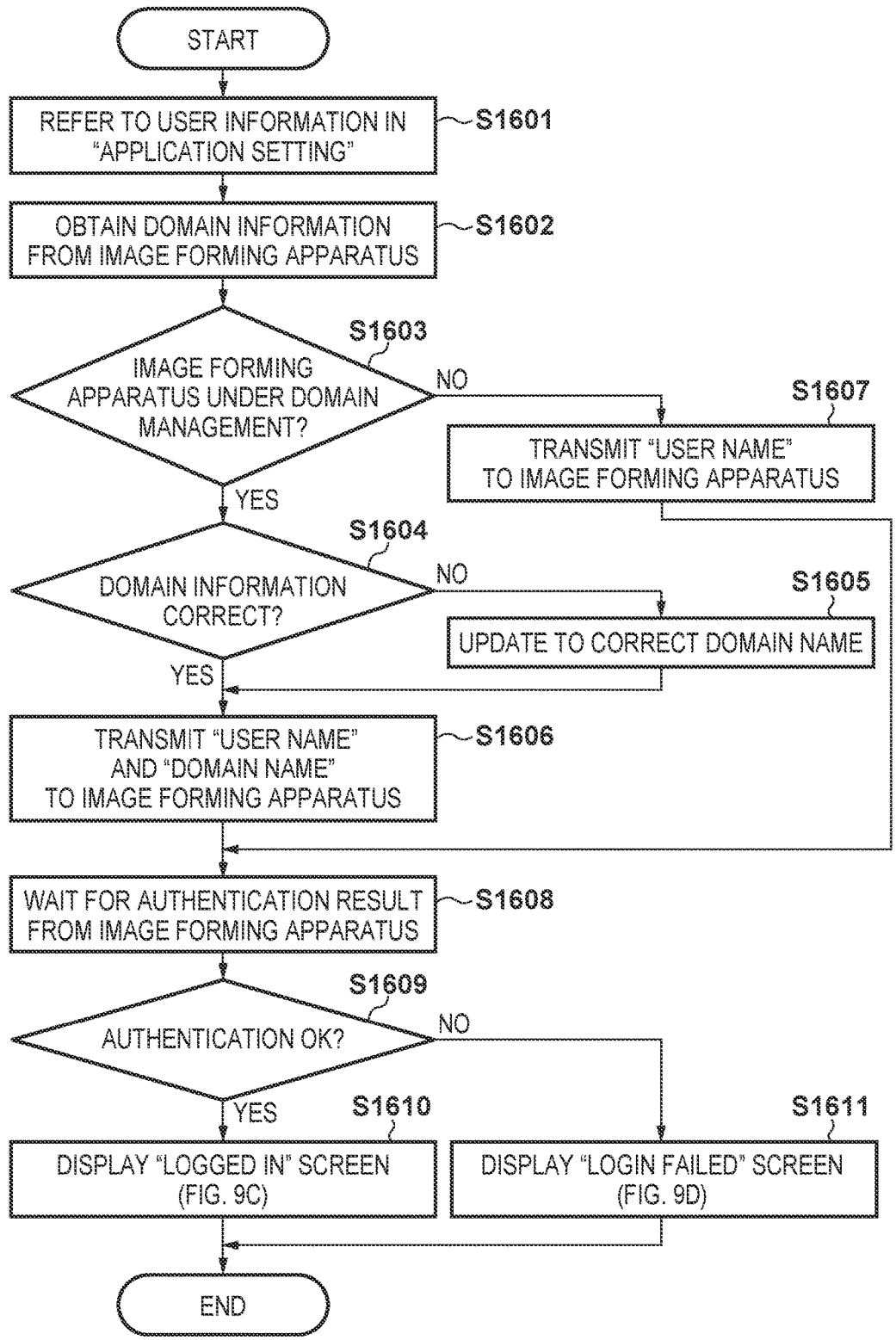
FIG. 16 is a flowchart for describing panel login processing by a cooperative application operating on a mobile terminal according to the third embodiment.

FIG. 16 is a flowchart for describing panel login processing by the cooperative application 300 operating on a mobile terminal 102 according to the third embodiment. Note that in the panel login processing, step S1601 is the same as step S1201 of the first embodiment, steps S1606 to S1611 are the same as steps S1203 to S1208 of the first embodiment, and thus a description thereof will be omitted.

In step S1602, a CPU 201 obtains domain information from the image forming apparatus 101. Next, the process advances to step S1603 in which the CPU 201 determines based on the domain information obtained in step S1602 whether or not the image forming apparatus 101 is under domain management. If the CPU 201 determines here that the image forming apparatus 101 is under domain management, the process advances to step S1604. If the CPU 201 determines that the image forming apparatus 101 is not under domain management, the process advances to step S1607. The process after step S1607 is the same as in FIG. 12 described above.

In step S1604, based on the domain information obtained in step S1602, the CPU 201 determines whether or not domain information set in the cooperative application 300 is set correctly. If the CPU 201 determines here that the domain information is set correctly, the process advances to step S1606 to perform the same processing as is steps S1203 and S1205-1208 in FIG. 12 described above. On the other hand, if the CPU 201 determines that the domain information set in the cooperative application 300 is not correct, the process advances to step S1605 in which the CPU 201 updates a domain name set in the cooperative application 300 to a domain name obtained in step S1602 and advances to step S1606.

As described above, according to the third embodiment, the application of the mobile terminal automatically determines whether the image forming apparatus is under domain management and in accordance with the determination, changes user information to be transmitted to the image forming apparatus. This makes it possible to implement both the storing printing function and the panel login function by using the same user information also in an environment where a PC which is under domain management and an image forming apparatus which is not under domain management exist.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-101143, filed May 22, 2017, which is hereby incorporated by reference herein in its entirety.

What is claimed is:

1. A non-transitory computer-readable storage medium storing a program for causing a computer to execute a method of controlling a mobile terminal, the method comprising:
    setting user information that includes at least a user name and a domain name of an authentication server for authenticating a user corresponding to the user name, based on a user operation;
    transmitting print data that includes information concerning the user information to an image processing apparatus;

determining to use the domain name included in the user information in a login request for the image processing apparatus in a case that the login request includes the domain name, and determining not to use the domain name included in the user information in the login request for the image processing apparatus in a case that the login request does not include the domain name.

2. The medium according to claim 1, the method further comprising:

transmitting the login request that includes the user information concerning at least the user name and the domain name to the image processing apparatus if it is determined to use the domain name in the determining, and transmitting the login request that includes at least the user name and does not include the domain name to the image processing apparatus if it is determined not to use the domain name in the determining.

3. The medium according to claim 2, the method further comprising:

setting whether or not the image processing apparatus is under the domain management in the authentication server based on a user operation, wherein, in the determining, in accordance with the setting indicating whether or not the image processing apparatus is under the domain management in the authentication server, it is determined whether or not to use the domain name in the login request.

4. The medium according to claim 3, wherein in the setting indicating whether or not the image processing apparatus is under the domain management in the authentication server, based on an acceptance of a user operation via a screen displayed on an operation unit of the mobile terminal, whether or not the image processing apparatus is under the domain management in the authentication server is set.

5. The medium according to claim 2, the method further comprising:

obtaining capability information from the image processing apparatus, wherein, in the determining, based on the obtained capability information, it is decide whether or not the image processing apparatus is under the domain management in the authentication server, and in accordance with the decision, it is determined whether or not to use the domain name in the login request.

6. The medium according to claim 5, wherein in the transmitting the login request, if a domain name of the capability information to which the image processing apparatus belongs and the set domain name do not match, the login request that uses at least the domain name to which the image processing apparatus belongs and the set user name is transmitted.

7. The medium according to claim 6, the method further comprising:

displaying information that prompts resetting of the user information if the domain name of the capability information to which the image processing apparatus belongs is different from the set domain name.

8. The medium according to claim 2, wherein in setting of the user information, a password is further able to be set as the user information, and if the password is set in setting of the user information, the login request that includes information related to the password is transmitted in the transmitting the login request.

9. The medium according to claim 2, wherein in the transmitting the login request, the login request is transmitted to the image processing apparatus by using GATT mobile via a Bluetooth Low Energy interface of the mobile terminal.

10. The medium according to claim 1, wherein the domain name is a domain name used when the image processing apparatus performs user authentication by using an external authentication server.

11. The medium according to claim 1, wherein the mobile terminal is a mobile terminal, and the program stored in the non-transitory computer-readable storage medium is an application program that is able to be installed in the mobile terminal.

12. The medium according to claim 1, the method further comprising:

obtaining domain information from the image processing apparatus to determine whether or not the image processing apparatus is under the domain management, wherein, in the determining, in accordance with whether or not the image processing apparatus is under the domain management, it is determined whether or not to use the domain name in the login request.

13. A method of controlling a mobile terminal, the method comprising:

setting user information that includes at least a user name and a domain name of an authentication server for authenticating a user corresponding to the user name, based on a user operation;

transmitting print data that includes information concerning the user information to an image processing apparatus;

determining to use the domain name included in the user information in a login request for the image processing apparatus based on whether the image processing apparatus is under domain management in the authentication server in a case that the login request includes the domain name, and determining not to use the domain name included in the user information in the login request for the image processing apparatus in a case that the login request does not include the domain name.

14. The method according to claim 13, further comprising:

transmitting the login request that includes the user information concerning at least the user name and the domain name to the image processing apparatus if it is determined to use the domain name in the determining, and transmitting the login request that includes at least the user name and does not include the domain name to the image processing apparatus if it is determined not to use the domain name in the determining.

15. The method according to claim 14, further comprising:

setting whether or not the image processing apparatus is under the domain management in the authentication server based on a user operation, wherein in the determining, in accordance with the setting indicating whether or not the image processing apparatus is under the domain management in the authentication server, it is determined whether or not to use the domain name in the login request.

16. The method according to claim 15, wherein in the setting indicating whether or not the image processing apparatus is under the domain management in the authentication server, based on an acceptance of a user operation via a screen displayed on an operation unit of the mobile terminal, whether or not the image processing apparatus is under the domain management in the authentication server is set.

17. The method according to claim 14, further comprising:
obtaining capability information from the image processing apparatus,
wherein in the determining, based on the obtained capability information, it is decided whether or not the image processing apparatus is under the domain management in the authentication server and in accordance with the decision, it is determined whether or not to use the domain name in the login request.

18. The method according to claim 17 wherein in the transmitting the login request, if a domain name of the capability information to which the image processing apparatus belongs and the set domain name do not match, the login request that uses at least the domain name to which the image processing apparatus belongs and the set user name is transmitted.

19. The method according to claim 5, further comprising:
displaying information that prompts resetting of the user information if the domain name of the capability information to which the image processing apparatus belongs is different from the set domain name.

20. The method according to claim 14, wherein in setting of the user information, a user password is further able to be set as the user information, and
if the user password is set in setting of the user information, the login request that includes information related to the user password is transmitted in the transmitting the login request.

21. A mobile terminal, comprising:
a memory device that stores a set of instructions; and
at least one processor that executes instructions stored in the memory device to:
set user information that includes at least a user name and a domain name of an authentication server for authenticating a user corresponding to the user name, based on a user operation;
transmit print data that includes information concerning the user information to an image processing apparatus;
determine to use the domain name in a login request for the image processing apparatus in a case that the login request includes the domain name; and
determining not to use the domain name included in the user information in the login request for the image processing apparatus in a case that the login request does not include the domain name.

* * * * *